July 15, 1969 V. B. HUNT 3,455,278

METHOD OF OYSTER CULTURE AND GEAR THEREFOR

Filed Nov. 21, 1966

INVENTOR
VERNON B. HUNT
BY
Ford E. Smith
ATTORNEY

United States Patent Office 3,455,278
Patented July 15, 1969

3,455,278
METHOD OF OYSTER CULTURE AND
GEAR THEREFOR
Vernon B. Hunt, 180 Hawthorn Drive,
Atherton, Calif. 94025
Filed Nov. 21, 1966, Ser. No. 595,840
Int. Cl. A01k 61/00
U.S. Cl. 119—4                           4 Claims

ABSTRACT OF THE DISCLOSURE

This application is concerned with improvements in oyster culture method and gear. A stake is disposed upright in an oyster growing ground and a slab-like cultch carrying oyster spat is secured on its upper end in spaced apart relation above the ground. The stake has associated with it chemical means constituting retardants or barriers to predators, competitors, and fouling organisms. Such means are located between the ground and the cultch for most effective functioning.

BACKGROUND

While the production of oysters is an important industry in the United States, and particularly on the Pacific coast of North America, it has declined from its earlier importance, in no small part, due to losses caused by poor ground conditions, by the attacks of predators, by the competition of other marine or sea life, and by problems caused by the presence of fouling organisms in the vicinity of the growing oysters. It is an important object of this invention to overcome these causes of oyster production decline.

Speaking with reference to the Pacific oyster, which is oviparous, a typical female oyster may discharge 200 million eggs into the water in a season. It is a common observation that the discharge of such eggs and their concentration in the water often occurs at places different from those ideally suited for growing oysters. The eggs are fertilized outside the parent oyster and the development of free-swimming larvae takes place in the water. Cultch is used to collect the larvae which readily attach themselves and begin to form as a small glue-like spot that gradually grows in area. The attached or set larvae are known as spat.

Cultch takes many forms of which oyster shells themselves are a very important type. Alternatively, concrete-covered boards, egg crates, box shook, and similar plate-like or slab-like elements are put in the water and on which the larvae are deposited and attached. In certain parts of the world roofing tiles are used. The larvae also attach themselves to stone or rock and on occasion to gravel. Synthetic cultch may comprise plastic sheets, tarred rope, boards and strings or chicken wire. In some instances, sticks and branches and brush constitute the cultch. This invention is more particularly related to those forms of cultch which have breadth and width and relative thinness and may be described as slab-like or plate-like.

For the Pacific oyster, the common form of cultch is oyster shells which are seeded in Japan or locally by being strung on wires and suspended from shell racks in tidal currents which sweep to and fro through the shells affording opportunity for the free-swimming larvae to attach themselves to the cultch. Normally such seeded shell cultch as a perforation by which it is strung on the wire. The seeded shells are transported to the Pacific coast for planting in the ideally suited growing areas or oyster beds extending from Alaska to California.

It has been customary for the oyster men to seed the growing grounds by broadcasting the seed over the surface of the growing grounds. Every effort is made to insure that the spread of oyster seed is as even as possible.

Since the larvae which have attached themselves to the cultch do so while the cultch is suspended in the water, the attachment can occur on all surfaces. Where the cultch is long and broad and relatively thin, it will be apparent that when it is deposited on the ground at least one major surface will be in intimate contact with the bed. In those cases where the bottom is silty, it is a common occurence that the spat on the underside of the cultch may be smothered and production of grown oysters thereby reduced. The culture method of spreading the oysters in the bed also subjects the young oyster to attack by predators of which starfish, oyster drills (Thais), and worms are among the well known. It is also a common observation that oysters in such a bed may suffer from mollusk competition and from the effect of fouling organisms, i.e., Crepidula sp. Turnicates, Polychaete worms, mussels, sponges and protozoa (Folliculina) to name a few.

It is another important object of this invention to improve the survival of the oysters on the cultch primarily by retarding the attacks by predators on the young oyster. Oyster drills are marine snails which crawl to and settle upon the young oyster. They have a rasping tongue with which they penearate the oyster's shell. Then they suck out the soft parts of the oyster. Certain of the worms, particularly the mud worms, *Polydora ciliata*, crawl into the shells when they are open and irritate the oyster to death. In certain areas the attack by starfish is particularly devastating.

Prior attempts have been made to protect the oyster from predation, competition and fouling by sea organisms. In general, such methods have been biological, mechanical and chemical. The instant invention involves a mechanico-chemical combination of method and means whereby the oyster on the cultch is removed and protected from attack by predators and the presence of competitors and fouling organisms is retarded or barred.

DESCRIPTION

In broad aspects this invention is concerned with the provision of an oyster culture method and suitable gear. A stake, to be disposed upright in an oyster growing ground, is provided so that its upper end is located appreciably above the ground surface. Slab-like, seeded cultch is secured on the upper end of the stake and is thereby supported in spaced relation above the ground. In effect the oyster set on the cultch is suspended in water and out of contact with the ground surface. Chemical means is associated with the stake between the ground and the cultch to constitute a retardant or barrier effective to reduce or prevent predation, and reduce the effects of competition and fouling of the cultch and its oyster set.

In the accompanying drawings is shown a typical installation of a portion of an oyster paddock according to this invention and the specific gear by which such installation may be obtained.

Figure 1:
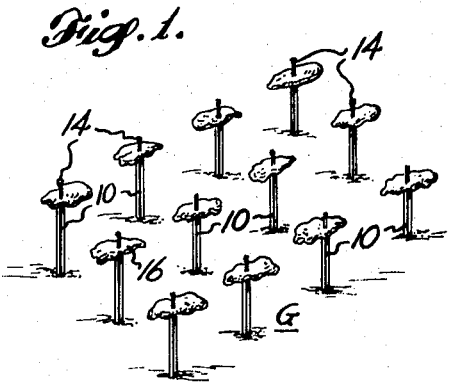
FIGURE 1 is a sketch view in perspective suggesting the manner in which a bed may be staked.
Figure 2:
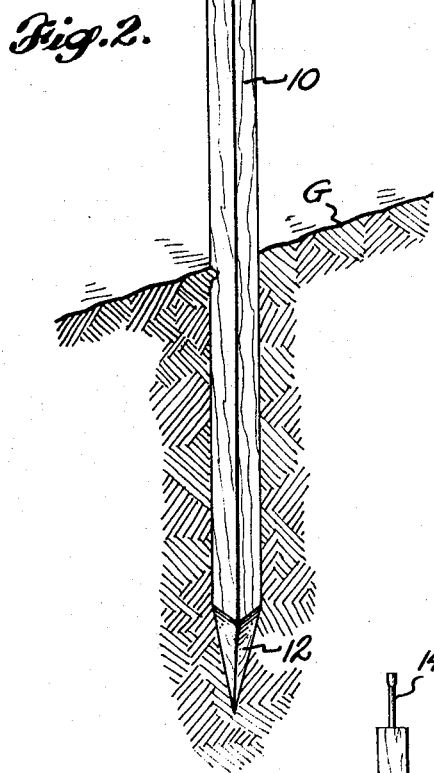
FIGURE 2 is an enlarged perspective view of a cultch-supporting stake and of the cultch supported thereby.

With patricular reference to FIGURE 2, the stake 10, desirably porous and non-metallic, preferably wood, may normally be about 20 to 28 inches in length and is 1″ x 1″ in cross-section. It may have a pointed end 12 to facilitate its penetration into the growing ground G. A pin 14 is provided at the upper end of the stake 10. The cultch 16, by means of hole 18, is mounted in bearing position on the upper end of the stake by means of pin 14. Set oysters 20 are shown growing on the cultch, on its upper and lower broad surfaces and even on the edges.

Figures 4, 5, 6:
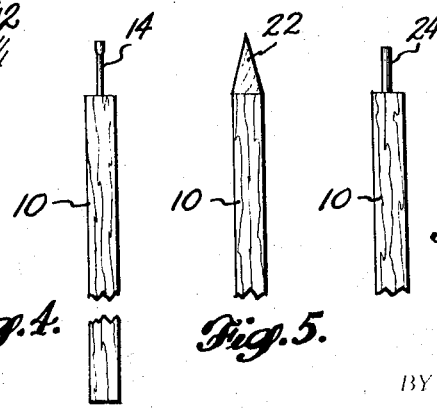
FIGURES 4, 5 and 6 illustrate various means by which the cultch may be secured to the supporting stake.

With reference to FIGURES 4-6, the pin 14 on stake 10 may be a nail which is preferably galvanized and therefore long lived; or it may have a sharpened end 22; or it may have a dowel end 24 integral or inserted.

Figure 3:
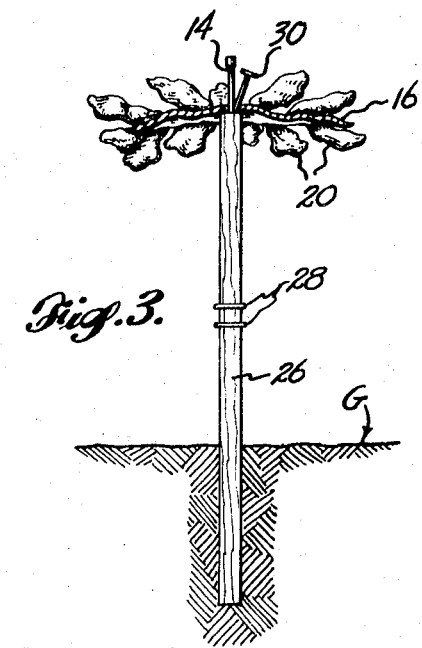
FIGURE 3 is a view in elevation illustrating a modified form of oyster culture gear.

In FIGURE 3, the stake 26 is provided with a copper wire band 28 which in some cases is effective to retard predators. In this instance the cultch 16 and its oyster set 20 not only is secured by pin 14, but a second angularly disposed pin 30 is also used. Preferably the latter is an uncoated wire nail of steel set at an angle to insure that the cultch will not be accidentally displaced during the first few months that it is in place on the stake. Because nail 30 is uncoated it immediately begins to rust upon immersion in salt water. In a few months it will be so weakened that it will easily break off, or by that time it will have disappeared. In the meantime, the oysters on the cultch, both those above and those below, are rapidly growing. By being placed appreciably above the ground G of the oyster bed, the oysters are disposed in the most favorable food level in the water. As they grow on the cultch they tend to assume a bell-like shape or to take the form of a crown. Probably due to the effect of gravity and their freedom from the bottom, the oysters on the underside of the cultch grow outward and downward to shape the mass to something like an inverted bowl. While it may rock due to wave action or water current, the cultch and the growing oyster will not readily be displaced from the stake because of the securing effect of pin 14. Normally the oysters on the underside of the cultch do not grow into intimate proximity with the stake. When harvesting occurs all that the oysterman need do is lift the bell or inverted bowl shaped cluster from the stake without disturbing it in the ground, if this is desirable.

It has been found that the treatment of the stake before it is disposed in the ground may be by employing chemical means of several varieties. The use of copper naphthanate compound (commonly available under the name "Cuprolignum" manufactured and sold by Rudd & Cumming, 1608 15th Ave. W., Seattle, Wash.) provides an effective predator barring or retarding material. The mentioned source of copper naphthanate is accompanied by pentachlorophenol, both being in a carrier in which the stakes may be immersed or with which they may be swabbed or painted. Alternative cuprous compounds may take the form of antifouling bottom paint commonly used in the preservation of boat and ship bottoms, and other of the well known copper preservative compounds, such, for example, as cuprous thiocyanate; cupric sulfate, ammoniated or not; or copper acetate, to name a few. It appears from experimentation that starfish, drills and mud worms particularly abhor the cuprous compounds of which copper naphthanate is a particularly effective material. In addition, the stake as well as the cultch may be treated with a chlorinated benzene compound either by dipping or spraying or by being brushed thereon. The desirable of such benzene compounds are polychlorinated benzene of which trichlorolbenzene and tetrachlorolbenzene are particularly effective as taught by the V. L. Loosanoff et al. Patent 3,103,202, issued Sept. 10, 1963. The presence of these chlorinated benzene compounds on the cultch supporting stake not only retards predation, but also prevents the attachment of mollusk competitors and fouling organisms which, upon growing, can so effectively increase the mass of the stake that upon the occurrence of strong tidal current or waves the stakes might be otherwise overturned in the beds.

The foregoing description has particularly referred to the oyster shell cultch of the type derived from Japan in which there is a hole provided when the cultch was strung on a wire for collection of oyster larvae. In the case of cultch such as concrete-covered boards, egg crates, box shook, tiles and similar slab-like or plate-like elements, it would likewise be desirable to provide a hole for securing the cultch in place on the stake. It is not absolutely necessary that a metallic nail or pin 14 be used. Alternatively the stake point 22, as shown in FIGURE 5, or a wooden dowel 24, as shown in FIGURE 6, may be inserted through the hole in the cultch.

In setting out the oyster bed, the oysterman preferably lays out a paddock wherein the stakes and cultch are spaced about 8 to 12 inches apart arranged in squares about 10' x 10'. Lanes are provided between adjoining squares. A desirable main unit of the paddock pattern comprises about sixteen such squares, about 43' x 43', in either direction including their appropriate lanes. Between adjacent large squares is desirably provided a boat or scow lane of, say, 20 feet in width. The oysterman can collect the oysters from the stakes and transport them to the scow either by hand or by using small rafts or floats.

Alternative lethal or toxic chemical materials for use in practicing this invention include mercuric compounds of which mercuric chloride is a specific member; magnesium compounds, specifically magnesium sulfate; alkali metal fluorides; arsenates; and like retardant materials.

By reason of supporting the slab-like cultch above its protection a greater number of the oyster set will grow and mature and the cultch and its oysters rapidly increases in size and weight. This not only raises ultimate survival and production but it constantly improves the securement of the cultch on the stake in its elevated position. The lengths of the stakes may be chosen to insure that the cultch is placed in the most desirable strata in the water for the best feeding of the young oysters. Also by choosing appropriate stake lengths relative the tidal changes of the water, controlled exposure of the oysters to the air may be arranged, all in accordance with oyster culture practices.

And, of course, by being suitably elevated above the ground the oyster young are not only physically removed from the crawling predators but the latter are repelled by the chemical means carried by the supporting stakes. The use of the ground piercing stakes permits seeding bottoms not otherwise suitable for oyster culture because of silt or mud on the bottom. Where deep penetration of the stake into the bottom is required to obtain suitable support, the length of the stakes may be increased. Likewise the cross-sections of the stakes may be varied to meet varying water current and tidal conditions, as well as to accommodate slab-like cultch of varying size. The stakes are inexpensive. Their setting is simple. Securing the cultch is by the simplest and most practical means. And, by appropriate planning, an oyster bed may be laid out which is easy to supervise and harvest.

From the foregoing description it will be seen that the invention, both as to method and gear, has been broadly and specifically disclosed. Modifications and alternatives will occur to those skilled in the art of culturing oysters. All such as fairly fall within the scope of the invention as defined by the following claims, giving due regard to an appropriately liberal application of the doctrine of equivalents, are intended to be embraced by this patent.

What is claimed is:
1. In the art of oyster culture, the method, comprising:
 (a) impregnating a porous, nonmetallic stake with a chemical means adapted to retard oyster predation, mollusk competition, and the accumulation of fouling mechanisms;
 (b) mounting said stake upright in an oyster growing ground; and
 (c) impaling a slab-like cultch bearing oyster spat on an upstanding pin means on the upper end of and generally normal to said stake in spaced relation to the surface of said growing ground.

2. Oyster culture gear, comprising:

a porous, nonmetallic stake disposed upright in an oyster-growing ground so that its upper end is located appreciably above the ground surface, said upper end supporting an upstanding cultch-impaling means;

a piece of slab-like cultch medially impaled on said means at the upper end of and generally normal to the stake, said cultch being supported in spaced apart relation above said ground;

an oyster set on said cultch; and chemical means applied to the surfaces of said stake above said ground and constituting a predator, competitor, and fouling organism retardant or barrier between said ground and said cultch.

3. The gear of claim 2 in which the cultch-impaling means on the upper end of the stake comprises an upstanding metallic pin and the cultch has a medial perforation larger than said pin and smaller than the said stake at its upper end.

4. The gear according to claim 3 in which the upstanding pin is formed of relatively durable metal and there is a second pin of relatively short-lived metal set at an angle thereto to form a securement having greater scope than the perforation in said cultch.

References Cited

UNITED STATES PATENTS

| 1,921,945 | 8/1933 | Robertson | 119—4 |
| 2,319,170 | 5/1943 | Toner | 119—4 |
| 3,294,062 | 12/1966 | Hanks | 119—4 |
| 3,316,881 | 5/1967 | Fischer | 119—4 |

FOREIGN REFERENCES

| 7,076 | 4/1928 | Australia. |
| 615,212 | 2/1961 | Canada. |
| 738,639 | 10/1932 | France. |

ALDRICH F. MEDBERY, Primary Examiner